United States Patent
Farley et al.

[11] 3,846,374
[45] Nov. 5, 1974

[54] 1,2-AZAPHOSPHOLANES AND THEIR 2-OXIDES, 2-SULFIDES AND SALTS AND PREPARATION THEREOF

[75] Inventors: Charles Edward Farley, Norwalk; Martin Grayson, Stamford, both of Conn.

[73] Assignee: American Cyanamid Company, Stamford, Conn.

[22] Filed: May 27, 1971

[21] Appl. No.: 289,373

Related U.S. Application Data

[63] Continuation of Ser. No. 801,748, Feb. 24, 1969, abandoned.

[52] U.S. Cl.............. 260/551 P, 252/401, 252/403, 252/8.1, 252/8.57, 8/94.16
[51] Int. Cl......................................... C07d 105/02
[58] Field of Search..................................... 260/551

[56] References Cited
OTHER PUBLICATIONS
Halferich et al., Ann., Vol. 655, p. 59–69, (1962).

*Primary Examiner*—Harry I. Moatz
*Attorney, Agent, or Firm*—Gordon L. Hart

[57] ABSTRACT

1,2-Azaphospholanes and their 2-oxides and 2-sulfides having the formula

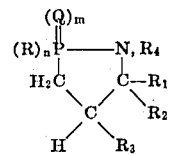

wherein R is alkyl of 1–8 carbon atoms or mononuclear aryl, $R_1$, $R_2$ and R, are hydrogen or lower alkyl, $R_4$ is hydrogen, lower alkyl, phenyl or alkylphenyl, Q is oxygen or sulfur, $m$ is 1 or zero and $n$ is 1 or 2 and salts thereof are provided. They are effective depilatories and unhairing accelerators and can also be used as lubricating oil antioxidants and as flame retardants in plastics and textiles. They are prepared by reacting an appropriately substituted 3-aminopropylphosphine with a dialkyl or diaryl disulfide. Sulfides and oxides are produced by heating 1,2-azaphospholanes contained triavalent phosphorus with sulfur or oxygen or by using 3-aminopropylphosphine sulfides or oxides as starting materials.

7 Claims, No Drawings

1,2-AZAPHOSPHOLANES AND THEIR 2-OXIDES, 2-SULFIDES AND SALTS AND PREPARATION THEREOF

This is a continuation of my copending Application Ser. No. 801,748, filed Feb. 24, 1969, now abandoned.

This invention relates to a new class of heterocyclic organophosphorus compounds, the 1,2-azaphospholanes, their 2-oxides and 2-sulfides, and salts thereof, as will hereinafter be more fully described. The invention includes the new compounds themselves, their methods of preparation, and compositions and processes wherein they are present as flame retardants, as depilatories or unhairing accelerators and, in the case of those compounds which contain higher 2-alkyl substituents, as lubricating oil antioxidants.

Our new 1,2-azaphospholanes are defined accurately by the formula (I) 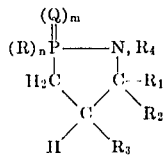

wherein R is alkyl of from 1 to about 18 carbon atoms or mononuclear aryl, $R_1$, $R_2$ and $R_3$ are hydrogen or lower alkyl, $R_4$ is hydrogen or a lower alkyl or a phenyl or lower alkylphenyl group, Q is oxygen or sulfur, m is 1 or zero and n is 1 or 2.

When m is zero and n is 2 the 1,2-azaphospholanes form salts in which the phosphorus is pentavalent. In these salts a positive charge is shared by the adjacent phosphorus and nitrogen atoms and they are therefore depicted accurately by the formula (II) 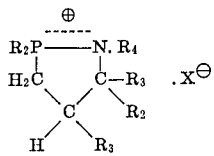

wherein X is a salt-forming anion such as a halogen, nitrate, sulfate, sulfide, acetate, carbonate, phenol, thiophenol and the like and R, $R_1$, $R_2$, $R_3$ and $R_4$ are as defined above. When n is 1, however, the 1,2 azaphospholanes and their 2-oxides and 2-sulfides form salts with these and other acids of the same type as those with other amines, i.e., salts in which the positive charge is carried by a quaternary amine nitrogen.

The 1,2-azaphospholanes are formed by ring-closing the corresponding secondary or tertiary 3-aminopropylphosphines, which have the formula (III) 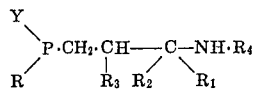

wherein the substituent R groups are as defined above and Y is R or hydrogen. We have found that this can be done by reacting them with a dialkyldisulfide or a diaryldisulfide. When a diaryldisulfide such as phenyldisulfide or tolydisulfide is reacted with a secondary aminopropylphosphine the corresponding thiophenol salt is formed directly:

(IV)

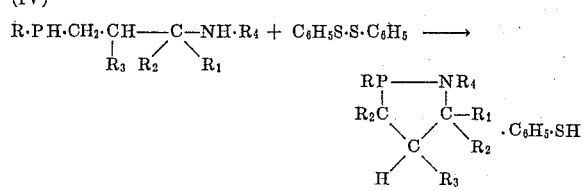

The dialkyldisulfides react in the same manner but yield the free 1,2-azaphospholanes rather than their salts. In both cases the reaction takes place spontaneously upon mixing the dialkyl or diaryl disulfide with the 3-aminopropylphosphine. No solvent need be used and no heating is necessary, although it is convenient to maintain the reagents at about 50°–90°C. for about 1–4 hours to be sure that the reaction is complete and optimum yields are obtained. The reaction products are then separated, preferably by distillation under reduced pressures. When increased purity is desired the process may be carried out in an inert atmosphere.

When diaryldisulfides are used the free 1,2-azaphospholanes are obtainable by thermally decomposing the thiophenol salts that are produced by Reaction (IV). This can be done during separation of the reaction products by distillation simply by using the proper distillation temperatures. Other salts are obtainable by reacting the free bases with the corresponding free acid, or the desired anion can be incorporated into the salt by ion-exchange with a suitable resin or by other known methods.

The 1,2-azaphospholane 2-oxides and sulfides are obtained by substituting the corresponding secondary aminopropylphosphine oxide or sulfide in reaction (IV). The phospine oxides and sulfides are easily prepared by dissolving the phosphine in ethanol or other suitable solvent and blowing it with air or by adding sulfur or hydrogen peroxide. The oxides are also obtainable by oxidizing those 1,2-azaphospholanes which contain trivalent phosphorus, preferably after dissolving them in benzene or other inert solvent. The 1,2-azaphospholane 2-sulfides can also be prepared by adding sulfur to benzene solutions of the same trivalent phosphorus-containing compounds.

The aminopropylphosphines used in making the 1,2-azaphospholanes of the invention are prepared by reacting equimolecular proportions of a mono- or dialkyl or arylphosphine with allylamine, a 2-lower alkyl-substituted allylamine, or a 1-mono- or di-lower alkyl substituted allylamine, any of which may be N-substituted by a phenyl or by a lower alkyl group. The reaction is preferably carried out in a suitable solvent such as benzene and in the presence of about 0.5 mol percent of a free radical initiator such as azobisisobutyronitrile using an atmosphere of inert gas such as nitrogen or argon and reaction temperatures of about 80°C. Allylamines that may be used have the formula

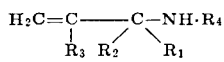

where $R_1$, $R_2$ and $R_3$ are hydrogen or lower alkyl radicals of about one to four carbon atoms and $R_4$ is hydrogen or a lower alkyl or a phenyl or lower alkylphenyl group. Representative of the amines that can be used are allylamine, allylmethylamine, (i.e., $CH_2=CH.—Ch_2NH.CH_3$), allylpropylamine, allylbutylamine, allyl aniline, allyl toluidines, 1-methylallylamine (i.e., $CH_2=CH.CH(CH_3)NH_2$), 1,1-dimethylallylamine, 1-butylallylamine, 2-methylallyamine and the like. Phosphines that may be used include both primary and secondary phosphines containing straight-chain or branched chain alkyl radicals of 1 to 18 carbon atoms or mononuclear aryl radicals such as phenyl, tolyl, xylyl, monochlorophenyl, dichlorophenyl and the like. Suitable phosphines have the formula $$R — PH — Y$$

in which R is an alkyl radical of 1-18 carbon atoms and preferably a straight-chain or branched-chain lower alkyl of about one to four carbon atoms, a phenyl radical, a lower alkylphenyl radical containing one or two alkyl substituents of about one to four carbon atoms, or a mono- or dihalogenated phenyl radical such as chlorophenyl, bromophenyl and the like and Y is R or hydrogen. When higher alkylphosphines containing one or two alkyls of about 12-18 carbon atoms are condensed with any of the above-described allylamines, the resulting 3-aminopropylphosphines and their oxides and sulfides will cyclize to 1,2-azaphospholanes that are soluble in hydrocarbon lubricating oils and are effective antioxidants therefor when used in amounts of about 0.1 to 2 percent on the weight of the oil.

Because of their 1,2-azaphospholane structure the compounds of our invention which contain trivalent phosphorus are all effective reagents for use in attacking the disulfide linkages of keratin. This includes the free 1,2-azaphospholanes as well as the salts of these compounds. They can therefore be used in depilatory compositions and as sharpening agents or accelerators in the lime baths employed in tanneries for unhairing hides and skins. Many of these compounds, and particularly those containing pentavalent phosphorus, are effective flame retardants when incorporated into plastics such as polyethylene or into textile finishes. Those compounds which contain higher alkyl radicals are also useful lubricating oil additives, as has been mentioned above.

The invention will be further described and illustrated by the following specific examples to which, however, it is not limited.

EXAMPLE 1

1,2-Azaphospholane, 2-Isobutyl, Thiophenol Salt

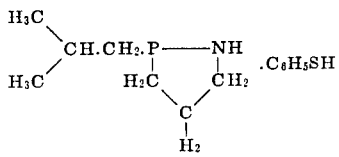

Phenyldisulfide (7.4 grams, 34 millimoles) and 5.4 grams (34 mmoles) of isobutyl-3-aminopropylphosphine were mixed at 25°C. An immediate exotherm raised the temperature to 75°C. The mixture was held at 80 ± 5°C. for 20 minutes and then fractionated to give 3.7 g. (96 percent) thiophenol and 4.8 g. (53 percent) of thiophenol salt of 2-isobutyl 1,2-azaphospholane, the desired product, which boiled at 127°–131°C. under 50 mm. of mercury pressure. Gasliquid chromatography using a 6 foot silicone column at 210°C. with a helium flow of 30 ml. per minute at 10 p.s.i. showed two peaks of nearly equal area, one of which was thiophenol. This indicates that the salt is rapidly dissociated by heat.

Calculated for $C_7H_{16}PH.C_6H_6S$:
C — 6.19, H — 8.69, N — 5.49, P — 12.14, S — 12.58

Found:
C — 60.55, H — 9.06, N — 5.63, P — 11.75, S — 12.0

The infrared spectrum showed $^+NH$ or $^+NH_2$ at 2500 — 2,900 cm$^{-1}$, $\phi$ S at 1,578 cm.$^{-1}$ and P-N at 1,143 cm.$^{-1}$ No SH, P-S or P=S absorptions were present.

The Nuclear Magnetic Resonance (N.M.R.) spectrum showed 2 aromatic absorptions centered at 7.48 and 7.08 delta, NCH$_2$ at 2.65, CH$_3$ doublet at 1.0, NH at 1.19 and all other protons between 1.35 and 2.2 delta. The ratios were 5:2:6:9 (aromatic: NCH$_2$:CH$_3$:all others), as required.

This compound can be used as a sharpening agent in the aqueous lime liquors employed in unhairing hides. Thus, for example, when it is added in amounts of 50–75 grams per liter to a saturated calcium hydroxide solution, used at 20°C. for unhairing fresh steer hides on the weight proportion of 1 part hide to 4 parts of solution, the time required for satisfactory hair removal is reduced to 2–3 days.

EXAMPLE 2

2,2-Di-n-propyl-1,2-azaphospholanium thiophenoxide

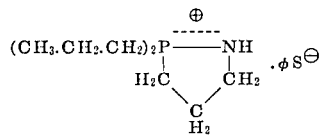

Phenyldisulfide (13.1 g.; 60 millimoles) and 11.0 grams; 60 millimoles of di-n-propyl-3-aminopropylphosphine were mixed at 25°C. A rapid exotherm to 70°C. occurred. The mixture was heated at 80± 10°C. for 1.5 hours and 6.7 g. (101 percent) of thiophenol collected by vacuum distillation. Two recrystallizations of the solid residue from ethyl acetate gave 12.6 grams (72 percent) of 2,2-di-n-propyl-1,2,azaphospholanium thiophenoxide, a white, extremely hygroscopic solid melting at 62°–65°C. It can be used as a flame retardant in textile finishing compositions.

EXAMPLE 3

1,2-Azaphospholane, 2-isobutyl, 2-oxide

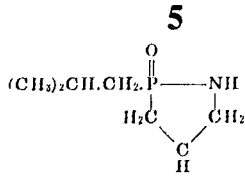

Phenyldisulfide (20.7 g.; 95 mmoles) and isobutyl-3-aminopropylphosphine oxide (95 millimoles) were mixed at 25°C. A rapid exotherm to 70°C. occurred and the mixture solidified. Benzene (50 ml.) was added and the mixture was heated at 60 ±5°C. for 17 hours. Fractionation gave 18.0 grams (86 percent) of thiophenol and 9.8 grams (64 percent yield) of 2-isobutyl-1,2-azaphospholane-2-oxide, the desired product. it boiled at 129°–134°C. at 0.60 mm. of mercury pressure. The compound crystallized on standing; the melting point of the solid was 55°–59°C.
Calculated for:
$C_7H_{16}PNO$: C-52.17, H-9.99, N-8.69, P-19.22
Found:
C-52.03, H-9.75, N-8.64, P-18.94

The N.M.R. spectrum showed NH at 5.3 delta, $CH_3$ doublet centered at 1.05, two peaks at 3.2 and 2.8 delta, believed to be non-equivalent $NCH_2$, and all other protons between 2.4 and 1.2 delta. The proton ratios in the above order were 1:6: 1:1:9. This compound is an effective flame retardant when applied to cotton percale in amounts of about 15 percent by weight.

EXAMPLE 4

2,2-Diethyl-1,2-azaphospholanium thiophenoxide

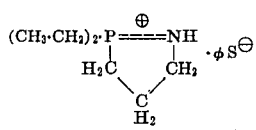

Diethyl-3-aminopropylphosphine (32.5 g.; 0.22 moles) and 48.2 g. (0.22 moles) of phenyldisulfide were mixed at 25°C. The exotherm was controlled by ice bath cooling while the temperature rose to 55°C. The mixture was then heated at 80°–88°C. for 1 hour. Vacuum distillation gave 24.0 grams (98 percent) of thiophenol.

The residue was the desired product, 2,2-diethyl-1,2-azaphospholanium thiophenoxide, a white, extremely hygroscopic crystalline solid which resisted attempts at recrystallization. Titration with standard iodine solution gave an equivalent weight of 260 as against 254 theoretical. The compound can be used in aqueous textile finishes as a flame retardant.

EXAMPLE 5

2,2-Diethyl-1,2-azaphospholanim iodide

About 13 grams of solid iodine was added slowly to a solution of 29.2 grams (0.11 moles) of the thiophenoxide of Example 4 in 155 ml. of acetonitrile at 25°–30°C. until the iodine color persisted. The solvent was removed by vacuum evaporation and the residue was extracted 3 times with 50 ml. portions of toluene at 108°C. Examination of the toluene extracts by gas-liquid chromatography showed the presence of 11.8 grams (95.3 percent) phenyldisulfide.

The toluene-insoluble portion was the 2,2-diethyl-1,2-azaphospholanium iodide. It crystallized on cooling to an extremely hygroscopic brown solid which resisted efforts at recrystallization.

EXAMPLE 6

2-Phenyl-1,2-azaphospholane

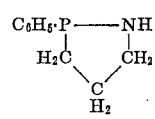

Phenyldisulfide (24.0 grams; 0.11 moles) was added slowly to a mixture of 18.4 grams (0.11 moles) of phenyl-3-aminopropylphosphine and 0.2 grams of hydroquinone at 25°–45°C. with ice bath cooling. The ice bath was removed and the temperature rose to 79°C. in 5 minutes. The mixture was then heated at 80°–90°C. for 1.5 hours. Fractionation gave 22 grams of thiophenol and 12.8 grams of crude 2-phenyl-1,2-azaphospholane, the desired product. Redistillation of this crude gave 7.3 grams (39.9 percent) of a pure product boiling at 145°–148°C. at 35 mm. of mercury pressure.
Calculated for $C_9H_{12}PN$:
C-65.50, H-7.32, N-8.49, P-18.76
Found:
C-65.28, H-7.43, N-8.29, P-18.54

This compound can be used as an unhairing accelerator in the manner described in Example 1.

EXAMPLE 7

Phenyl-3-aminopropylphosphine (16.7 g.; 0.10 moles) and 17.8 g. (0.10 moles) of n-butyldisulfide were mixed together and reacted by heating under argon at 80° ± 5°C. in the presence of 0.1 g. of hydroquinone for 4 hours. Fractionation yielded 15.7 g. (87 percent) of n-butylmercaptan and 12.1 g. (73 percent) of 2-phenyl-1,2-azaphospholane, the same product that was obtained in Example 6.

EXAMPLE 8

2-Phenyl-1,2-azaphospholane, 2-oxide

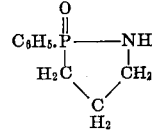

Phenyldisulfide (25.3g.; 0.13 moles) was added to a solution of 0.13 gram moles of phenyl-3-aminopropylphosphine oxide and 0.2 grams of hydroquinone in 25 ml. of benzene. The reaction was rapid and exothermic and raised the temperature to 70°C. The mixture was heated at 70°–80°C. for 1.5 hours. Fractionation then gave 26.3 grams of thiophenol and 20.4 grams (86.8 percent yield) of 2-phenyl-1,2- azapholane, 2-oxide, the desired product, which boiled at 177°–185°C. at 0.1 mm. of mercury pressure. The compound crystallized on standing. Recrystallization from a benzene-hexane mixture gave a product melting at 89.5°–91.0°C.
Calculated for:
C₉H₁₂PNO: C-59.53, H-6.72, N-7.73, P-17.08
Found:
C-59.88, H-6.77, N-7.72, P-16.72

EXAMPLE 9

2-Phenyl-1,2-azaphospholane, 2-sulfide

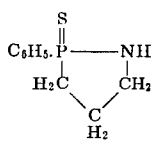

Sulfur (0.64 grams) was slowly added to a solution of 3.1 grams (18.8 millimoles) of the 2-phenyl-1,2-azaphospholane of Example 6 in 15 ml. of benzene at 25°–35°C. The solution was stirred overnight at 24°C. and distilled to give 2.7 grams (73 percent yield) of 2-phenyl-1,2-azaphospholane, 2-sulfide, the desired product. It boiled at 156°–158°C. at 0.24 mm. of mercury pressure. On standing it crystallized to a solid melting at 60°–63°C.
Calculated for C₉H₁₂PNS:
C-54.82, H-6.13, N-7.10, P-15.71
S-16.27
Found:
C-53.96, H-6.04, N-6.98, P-15.88,
S-16.42

This compound, and also the corresponding 2-oxide of Example 8, can be used as a flame retardant in textile finishes and also in molded polyethylene and polypropylene plastics. Because of its phosphorus sulfide group it is also an effective antioxidant.

EXAMPLE 10

1-Methyl-2-phenyl-1,2,azaphospholane

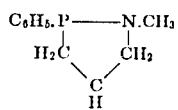

Phenyl-3-N-methylaminopropylphosphine (18.1 g.; 0.10 moles) and 21.8 g. (0.10 moles) of phenyldisulfide were mixed at 25°C. under an atmosphere of argon. A rapid reaction raised the temperature to 75°C. within a few minutes. The mixture was held at 75° ± 5°C. for 1 hour and then fractionally distilled to give 19.4 g. (88 percent) of thiophenol and 12.1 g. (68 percent) of 1-methyl-1,2-phenyl-1,2-azaphospholane that boiled at 152–154°C. at 30 mm. of mercury pressure.

EXAMPLE 11

2-n-Hexadecyl-1,2-azaphospholane, 2-oxide

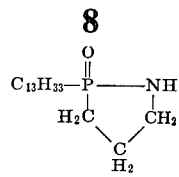

n-Hexadecyl-3-aminopropylphosphine oxide (16.6 g; 50 millimoles) and 10.9 g. (50 mmoles) of phenyldisulfide were mixed under argon at 25°C. A slow exotherm raised the temperature to 55°C. over 10 minutes. The mixture was then heated at 85 ± 5°C. for 3.5 hours. Careful fractional distillation yielded 8.4 g. (76 percent) thiophenol and 11.7 g. (71 percent) 2-n-hexadecyl-1,2,azaphospholane, 2-oxide. Its boiling point was 207°–212°C. at 0.04 mm. of mercury. It was soluble in hydrocarbon solvents such as naphtha, kerosene and 10-W grade lubricating oil.

The corresponding 2-sulfide was also prepared by the same procedure. To a solution of 14 grams (0.05 moles) of n-hexadecyl-3-aminopropylphosphine in 50 ml. of ethanol there was slowly added 1.6 grams of finely divided sulfur and the solution was agitated at about 50°C. until the n-hexadecyl-3-aminopropylphosphine sulfide was formed. This was reacted with 10.9 grams of phenyldisulfide in the manner described above. The resulting 2-n-hexadecyl-1,2-azaphospholane 2-sulfide was soluble in naphtha, kerosene and lubricating oil.

Both of these products were found to be good antioxidants for hydrocarbon lubricating oils when tested at 0.5 percent concentration in a mid-continent oil of 10-W grade by the catalytic Indiana Test.

EXAMPLE 12

2-Phenyl-4-Methyl-1,2-azaphospholane

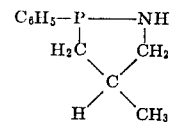

Phenyl-2-methyl-3-aminopropylphosphine (9.1 g; 50 millimoles) and 10.9 grams (50 millimoles) of phenyldisulfide were mixed under argon at 25°C. A reaction occurred raising the temperature to 70°C. The mixture was kept at 70° ± 5°C. for 1.5 hours and then fractionally distilled to yield 9.7 grams (88 percent) thiophenol and 4.9 grams (55 percent) of 2-phenyl-4-methyl-1,2-azaphospholane, a colorless liquid that boiled at 154°–157°C. under 35 mm. of mercury pressure.

EXAMPLE 13

2-Phenyl-5-methyl-1,2-azaphospholane

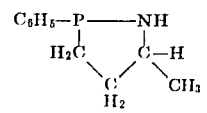

The procedure of Example 12 was repeated in all respects using phenyl-3-methyl-3-aminopropylphosphine as the starting material. The 2-phenyl-5-methyl-1,2-azaphospholane was obtained in comparable yields.

We claim:

1. A 1,2-azaphospholane compound or salt, consisting of
   a. a compound having the formula

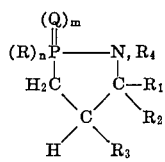

wherein R is selected from alkyl of 1 to 18 carbon atoms, phenyl, mono- and di-substituted alkylphenyl, chlorophenyl, and bromophenyl, $R_1$, $R_2$ and $R_3$ are hydrogen or lower alkyl, $R_4$ is a member of the group consisting of hydrogen, lower alkyl, phenyl and lower alkylphenyl, Q is oxygen or sulfur, $n$ is 1 and $m$ is zero or 1, or
   b. a salt having a cation of the formula shown wherein R, $R_1$, $R_2$, $R_3$ and $R_4$ are as defined, m is zero and n is 1 or 2, with a salt forming anion selected from halogen, nitrate, sulfate, sulfide, acetate, carbonate, phenol, and thiophenol.

2. An azaphospholane compound or salt defined by claim 1 wherein $R_1$, $R_2$ and $R_3$ are hydrogen.

3. An azaphospholane compound or salt defined by claim 2 wherein $R_4$ is hydrogen.

4. An azaphospholane salt defined by claim 3 wherein $n$ is 2.

5. An azaphospholane salt defined by claim 3 wherein $n$ is 1.

6. An azaphospholane compound defined by claim 3 wherein m is zero and R is alkyl.

7. A method of producing a 1,2-azaphospholane compound or salt defined by claim 1 which comprises the step of ring-closing an aminopropylphosphine selected from the group consisting of (a) 3-aminopropylphosphines of the formula

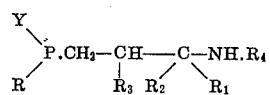

wherein R, $R_1$, $R_2$, $R_3$ and $R_4$ are as defined in claim 1 and Y is hydrogen or R and (b) 1-oxides and 1-sulfides of such 3-aminopropylphosphines, by reacting the selected 3-aminopropylphospine or 1-oxide or 1-sulfide with a substantially equimolecular quantity of an organic disulfide selected from the group consisting of dialkyldisulfides and diaryldisulfides.

* * * * *